July 25, 1961 T. S. KULKA 2,993,588

REEL ENGAGING TAPE RETAINING MEANS

Filed July 12, 1960 2 Sheets-Sheet 1

INVENTOR

THOMAS S. KULKA

BY Almon S. Nelson

ATTORNEY

July 25, 1961 T. S. KULKA 2,993,588

REEL ENGAGING TAPE RETAINING MEANS

Filed July 12, 1960 2 Sheets-Sheet 2

INVENTOR
THOMAS S. KULKA

BY Elmon S. Nelson
ATTORNEY

United States Patent Office 2,993,588
Patented July 25, 1961

2,993,588

REEL ENGAGING TAPE RETAINING MEANS

Thomas S. Kulka, 200 Film Bldg., 2108 Payne Ave., Cleveland 14, Ohio

Filed July 12, 1960, Ser. No. 42,429
12 Claims. (Cl. 206—53)

Figure 1:
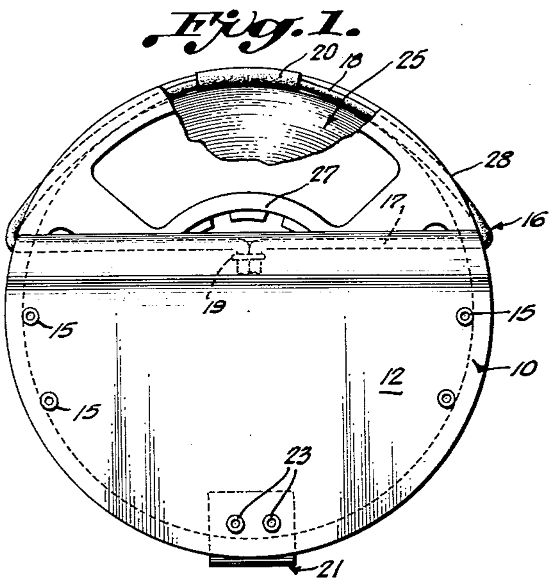

This invention relates to the storage of tape on reels and more particularly to a device for convenient application to a reel which will operate to retain the tape thereon during storage or other periods of non-use and which may be conveniently removed to permit unwinding of the tape from the reel.

During the past few years there has been widespread activity in the development and use of magnetic tape for the recording of sound and more recently, tape has also been used for video recording in connection with television and for other uses. It is common practice to utilize reels for holding and storing the tape, such reels commonly being provided with a core or hub and spaced flanges. While the tape retaining means of this invention is primarily intended for use in connection with sound or video tape, nevertheless, the same may also be utilized with motion picture film or other film which may be wound or stored on a reel.

Considerable difficulty has been experienced in providing adequate and convenient means for retaining tape on reels between periods of use, since it is imperative that the tape not be damaged by abrasion or otherwise and also it is imperative that the retaining means be capable of convenient and rapid application to the reel and removal therefrom. The simplest type of retaining means is, of course, an elastic or rubber band, but considerable difficulty has been experienced in utilizing such a means, in that the band tends to become displaced and to enter the space between the edges of the tape and the flanges of the reel, thereby rendering the retaining means useless and permitting the tape to unwind. Numerous other devices have been proposed and utilized for retaining tape on reels and while some of these are suitable for specific application, particularly where a relatively narrow tape is utilized many of these are not suitable for use with relatively wide tape which is commonly utilized for video operations and also in connection with some certain types of sound recording and also many of these prior art retaining means were relatively complex and cumbersome with the result that use thereof was somewhat difficult and also such retaining means were frequently inadvertently displaced thereby permitting the tape to unwind.

It is accordingly an object of the present invention to provide a reel engaging tape retaining means which may be conveniently and quickly applied to a reel of tape to retain the tape wound thereon or removed to permit unwinding of the tape.

A further object of the invention is the provision of a reel engaging tape retaining means which may be applied to a reel of tape to prevent unwinding of the tape thereof and which means will not be inadvertently displaced during any ordinary and normal use of the device.

A still further object of the invention is the provision of a reel engaging tape retaining means incorporating structure which prevents displacement of the retaining means between the edges of the tape and the flanges of the reel.

Another object of the invention is the provision of a reel engaging tape retaining means which will occupy substantially the same position on a reel, regardless of the width of the tape or the length thereof wound on the reel.

A further object of the invention is the provision of a reel engaging tape retaining means, including a yieldable band for engaging the tape and in which such band may be constructed of elastic material or in which a tension spring may be provided to give the band elasticity.

A still further object of the invention is the provision of a reel engaging tape retaining means which may be conveniently and economically constructed from readily available material and in which the portion engaging the tape is of yieldable material, thereby preventing damage to such tape.

Figure 2:
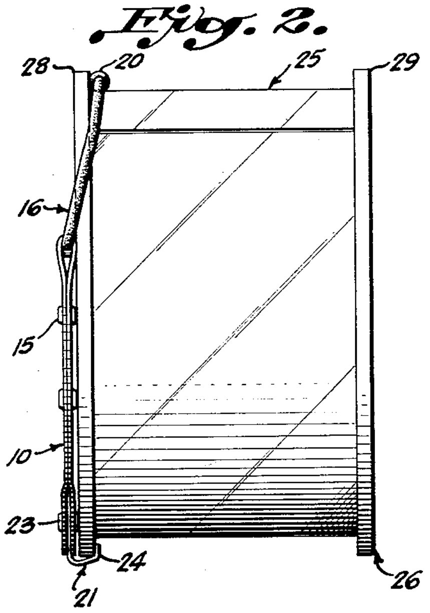
Figures 3, 5:
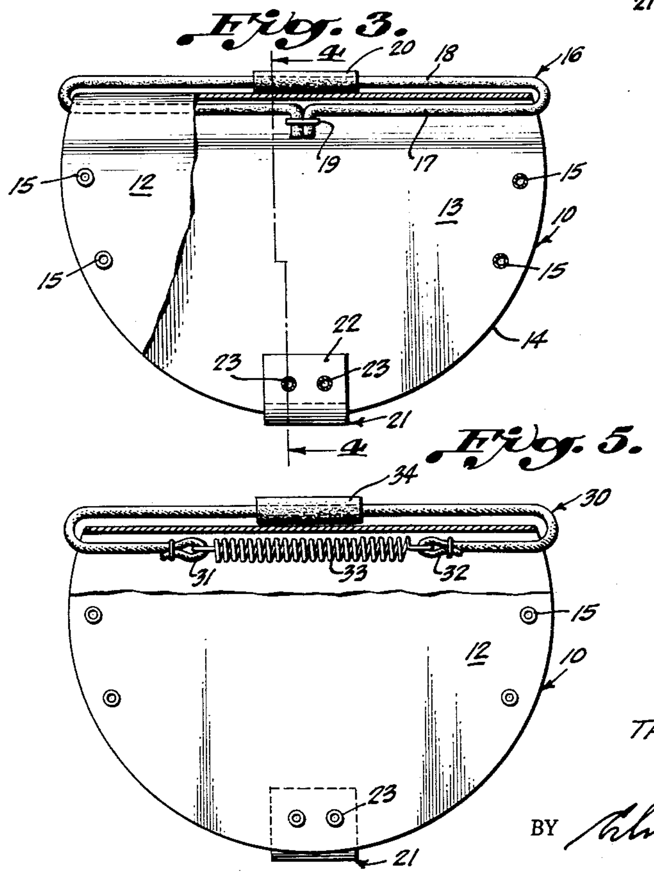
Figure 4:
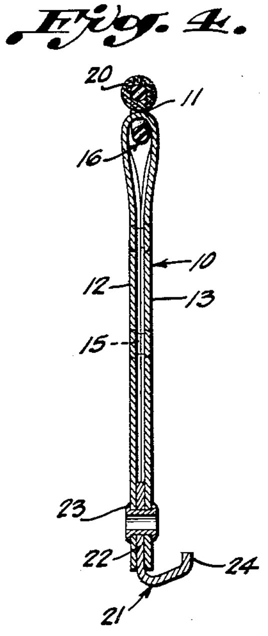
Figure 6:
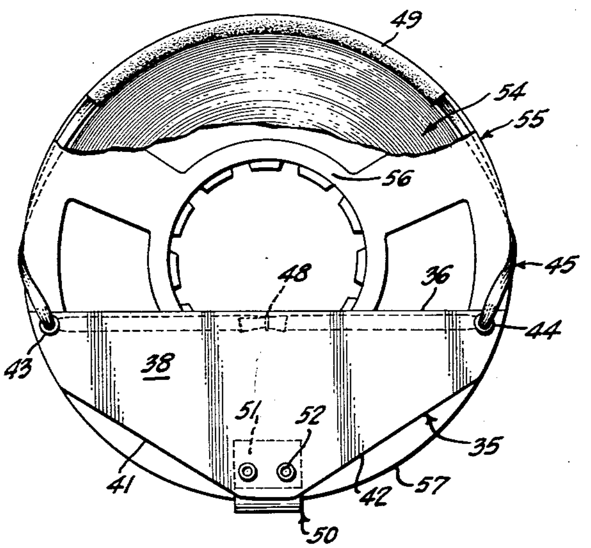
Figure 7:
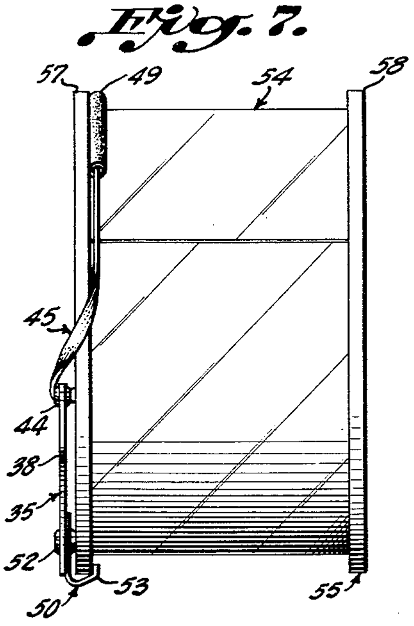
Figure 8:
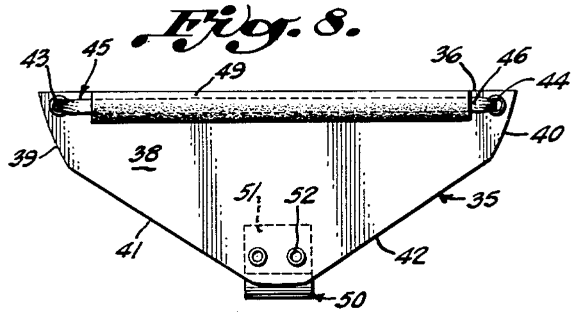
Figure 10:
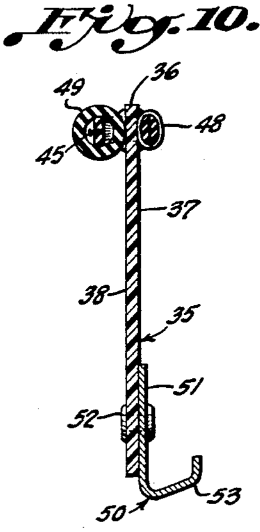
Figure 9:
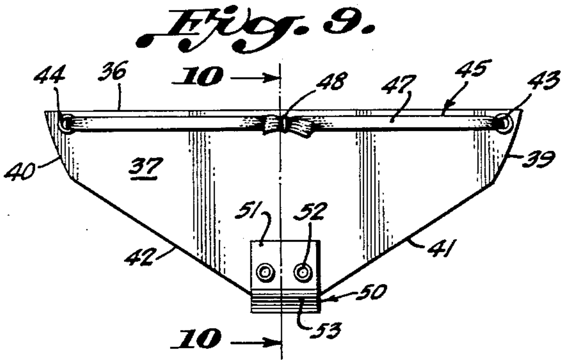

Further objects and advantages of the invention will be apparent from the following description taken in conjunction with the accompanying drawing wherein:

FIG. 1 is a side elevational view of a tape retaining means constructed in accordance with this invention and applied to a reel of tape and with a portion of the reel flange broken away in order to show the engagement of the retaining means with the tape;

FIG. 2 a side elevational view of the structure shown in FIG. 1;

FIG. 3 a front elevational view of the tape retaining means of this invention with parts broken away and in section for greater clarity and showing the internal structure of the device;

FIG. 4 a sectional view taken substantially on the line 4—4 of FIG. 3;

FIG. 5 a view similar to FIG. 3, but showing a slightly modified form of the invention;

FIG. 6 a side elevational view of a modified form of tape retaining means constructed in accordance with this invention and applied to a reel of tape and with a portion of the reel flange broken away in order to show the engagement of the retaining means with the tape;

FIG. 7 a side elevational view of the structure shown in FIG. 6;

FIG. 8 a rear elevational view of the tape retaining means shown in FIG. 6 and showing the yieldable cylindrical tape engaging enlargement;

FIG. 9 a front elevational view of the tape retaining means shown in FIG. 6; and FIG. 10 a sectional view taken substantially on the line 10—10 of FIG. 9.

With continued reference to the drawing and particularly FIGS. 3 and 4, there is shown a tape retaining means constructed in accordance with this invention and which may well comprise a flat sheet of material 10, such as plastic or other suitable material and the sheet 10 is folded at 11 to provide front and back sections 12 and 13 respectively. The front and back sections 12 and 13 are provided with an arcuate outer edge 14 having an angular length slightly greater than a semi-circle and as clearly shown in FIG. 3, the folded edge 11 extends between the ends of the arcuate edges 14.

The front and back sections 12 and 13 of the sheet 10 may be secured together at spaced points by rivets 15 or other suitable fastening means and as clearly shown in FIG. 3 and 4, an elastic band 16 of rubber or other suitable material is applied to the sheet 10 with a portion 17 disposed between the front and back sections 12 and 13 and adjacent the folded edge 11 and with the remaining portion 18 of the band 16 disposed exteriorly of the sections 12 and 13. The band 16 may be endless or as shown in FIG. 3, may be formed from a length of elastic material and joined together at 19 by any suitable means with such joint 19 being disposed between the front and back sections 12 and 13 of the sheet 10. A sleeve 20 of yieldable material and somewhat larger in diameter than the band 16 is applied to the exterior portion 18 of the band 16 substantially midway of the length thereof, as shown in FIG. 3 and the purpose of such tubular member 20 will be later described. A hook 21 of metal or other suitable material has a portion 22 disposed between the front and back sections 12 and 13 diametrically opposite the folded edge 11 and a rivet 23 or other suitable fastening means extends through the front and back sections 12 and 13, as well as the portion 22 of the hook 21 in order to secure such hook in place. A portion 24 of the hook 21 extends inwardly of the back section 13 for a purpose which will presently appear.

In the use of the tape retaining means above described, it is assumed that a length of tape 25 is wound on a reel 26, such reel being conventional and being provided with a core or hub 27 and spaced flanges 28 and 29 and as clearly shown in FIGS. 1 and 2, the retaining means of this invention is applied in such a manner that the sleeve 20 provides a yieldable tape engaging means which is disposed inwardly of the flange 28 and in engagement with the surface of the tape 25 and in order to retain the member 20 in engagement with the tape 25 to prevent unwinding of the same, the portion 24 of the hook 21 is engaged over the opposite edge of the flange 28 of the reel 26 which will, of course, operate to stretch the band 16, thereby exerting pressure on the tape 25 to prevent unwinding of the same. When it is desired to utilize the tape 25, it is only necessary to disengage the hook 21 from the flange 28 whereupon the entire retaining means can be conveniently removed.

While an enlargement 20 for engaging the tape 25 is shown and described, it is to be understood that, if desired, the diameter of the band 16 may be made sufficiently large to prevent passage of the same between the edges of the tape 25 and the flanges 28 and 29 of the reel 26, but in most instances, the enlarged tape engaging sleeve 20 is preferable, since this will compensate for warped or deformed flanges and will always insure that the retaining means engages the tape, rather than slipping between the edges of the tape and the flange.

As was stated above, the band 16 may be made endless or may be secured together to provide an endless band and it was also indicated that such band was formed of elastic material. However, if desired, as shown in FIG. 5, a band 30 of non-elastic material may be utilized and the ends 31 and 32 of such band 30 may be attached to the ends of a tension spring 33 with the spring 33 disposed between the front and back sections 12 and 13, thereby providing yieldability for the band 30 to permit application thereof to the tape on a reel in the same manner as described above in connection with the first form of the invention. Also in the form of the invention shown in FIG. 5, an enlarged sleeve 34 of yieldable material may be provided on the band 30 or the diameter of the band 30 may be sufficient to accomplish the same purpose. However, as explained above, the provision of a sleeve 34 is preferable.

In the modified form of the invention shown in FIGS. 6 to 10 there is provided a tape retaining means which may well comprise a flat sheet 35 of substantially rigid material, such as plastic or the like, and as shown, the sheet 35 is of generally triangular configuration, but other suitable shapes may be employed. The sheet 35 is provided with a straight edge 36 of a length not greater than the diameter of the flange of a reel to which the retaining means is to be applied and the sheet 35 serves to provide a rear flange engaging surface 37 and an exposed front surface 38. As shown in FIG. 8, the peripheral edge opposite the straight edge 36 may be formed of arcuate sections 39 and 40 and straight sections 41 and 42 to provide a generally triangular configuration, but if desired, this entire peripheral edge may be arcuate or may be in any other desired form which will lie within the periphery of the flange of the reel to which the retaining means is to be applied.

The sheet 35 is provided with eyelets 43 and 44 adjacent the opposite end of the straight edge 36 and extending through the eyelets 43 and 44 is an elastic band 45. The elastic band 45 provides a rear portion 46 extending across the rear surface 37 of the sheet 35 and a front portion 47 extending across the front surface 38 of the sheet 35. The band 45 may be joined together at its end by suitable fastening means 48 disposed on the front portion 47 of the band 45.

A tape engaging member in the form of a yieldable cylindrical enlargement 49 may be provided on the rear portion 46 of the band 45 and the enlargement 49 may comprise a tubular rubber member or the same may be formed of any other suitable yieldable and flexible material. While it is preferable to utilize the cylindrical enlargement 49, nevertheless, if desired, such enlargement may be omitted and the tape engaged by the rear portion 46 of the band 45. In some instances, however, the portion 46 of the band 45 might slip between the edge of the tape and the inner surface of the reel flange and consequently, it is preferable to provide the tape engaging enlargement 49.

A flange engaging hook 50 of metal or other suitable material is provided with a straight portion 51 secured to the sheet 35 by rivets or other suitable fastening means 52 and a hook portion 53 extends rearwardly of the rear portion of the rear surface 37 of the sheet 35 for a purpose which will presently appear.

In the use of the modified form of tape retaining means above described and shown in FIGS. 6 to 10, it is assumed that a length of tape 54 is wound on a reel 55, such reel being conventional and being provided with a core or hub 56 and spaced flanges 57 and 58 as clearly shown in FIGS. 6 and 7. The tape retaining means of FIGS. 6 to 10 is applied in such a manner that the sleeve 49 provides a yieldable tape engaging means which is disposed inwardly of the flange 57 and in engagement with the surface of the tape 54 and in order to retain the member 49 in engagement with the tape 54 to prevent unwinding of the same, the portion 53 of the hook 50 is engaged over the opposite edge of the flange 57 of the reel 55, which as shown in FIGS. 6 and 7 will operate to stretch the band 45 thereby exerting pressure on the tape 54 to prevent unwinding of the same. When it is desired to utilize the tape 54 it is only necessary to disengage the hook 50 from the flange 57 whereupon the entire retaining means can be conveniently removed.

While eyelets 43 and 44 are shown in the sheet 35 for receiving the band 45, it will be understood that if desired, such eyelets may be omitted and the band allowed to pass through apertures in the sheet 35. However, eyelets are preferable to prevent tearing of the sheet 35 during use of the retaining means of this invention.

It will be seen that by the above described invention there has been provided an extremely simple, yet highly efficient retaining means which may be very economically constructed and which may also be conveniently applied to or removed from a tape reel. Also the tape is only engaged by a yieldable or soft member thereby preventing damage to the tape and inadvertent displacement of the retaining means is prevented by the effective and novel structure thereof.

It will be obvious to those skilled in the art that various changes may be made in the invention without departing from the spirit and scope thereof and therefore the invention is not limited by that which is shown in the drawings and described in the specification, but only as indicated in the appended claims.

What is claimed is:

1. Tape retaining means for tape wound on a reel having a hub and spaced flanges, said retaining means comprising a flat folded sheet with an arcuate outer edge having an angular length slightly greater than a semi circle, the fold in said sheet extending between the ends of said arcuate edge to provide front and back sections, an elastic band having a portion extending between said sections adjacent said fold with the remaining portion of said band disposed exteriorly of said sections, a tape engaging yieldable cylindrical enlargement on the exterior portion of said band, means for securing said front and back sections together and a metallic hook secured to said sections diametrically opposite said fold, said hook projecting inwardly of said back section, whereby said enlargement may be disposed inwardly of a flange of a reel in engagement with the tape with said back section engaging the outer side of said flange and said hook engaging over said flange to maintain said retaining means in position.

2. Tape retaining means for tape wound on a reel having a hub and spaced flanges, said retaining means comprising a flat folded sheet with an arcuate outer edge, the fold in said sheet extending between the ends of said arcuate edge to provide front and back sections, an elastic band having a portion extending between said sections adjacent said fold with the remaining portion of said band disposed exteriorly of said sections, a tape engaging yieldable cylindrical enlargement on the exterior portion of said band, means for securing said front and back sections together and a metallic hook secured to said sections diametrically opposite said fold, said hook projecting inwardly of said back section, whereby said enlargement may be disposed inwardly of a flange of a reel in engagement with the tape with said back section engaging the outer side of said flange and said hook engaging over said flange to maintain said retaining means in position.

3. Tape retaining means for tape wound on a reel having a hub and spaced flanges, said retaining means comprising a flat folded sheet with an arcuate outer edge, the fold in said sheet extending between the ends of said arcuate edge to provide front and back sections, an elastic band having a portion extending between said sections engaging said fold with the remaining portion of said band disposed exteriorly of said sections, means for securing said front and back sections together and a hook secured to said sections diametrically opposite said fold, said hook projecting inwardly of said back section, whereby said band may be disposed inwardly of a flange of a reel in engagement with the tape with said back section engaging the outer side of said flange and said hook engaging over said flange to maintain said retaining means in position.

4. Tape retaining means for tape wound on a reel having a hub and spaced flanges, said retaining means comprising a flat folded sheet with an arcuate outer edge, the fold in said sheet extending between the ends of said arcuate edge to provide front and back sections, a yieldable band having a portion extending between said sections adjacent said fold with the remaining portion of said band disposed exteriorly of said sections, means for securing said front and back sections together and a hook secured to said sections diametrically opposite said folds, said hook projecting inwardly of said back section, whereby said band may be disposed inwardly of a flange of a reel in engagement with the tape with said back section engaging the outer side of said flange and said hook engaging over said flange to maintain said retaining means in position.

5. Tape retaining means as defined in claim 4, in which said band comprises a length of flexible material and a tension spring connected between the ends of said band, said spring being disposed between said sections adjacent said fold.

6. Tape retaining means as defined in claim 5, in which an enlarged sleeve of yieldable material is disposed on the exterior portion of said band for engaging said tape.

7. Tape retaining means for tape wound on a reel having a hub and spaced flanges, said retaining means comprising a flat sheet of relatively rigid material providing a rear surface for engaging the side of a reel and an exposed front surface, a straight edge on said sheet of a length not greater than the diameter of a reel to which said retaining means is to be applied, the remaining periphery of said sheet being formed to lie within the periphery of the reel flanges when applied to a reel, an elastic band connected to said sheet immediately adjacent said straight edge, a tape engaging yieldable cylindrical enlargement on the portion of said band adjacent said rear surface and a metallic hook secured to said sheet opposite said straight edge, said hook projecting inwardly of said rear surface, whereby said enlargement may be disposed inwardly of a flange of a reel in engagement with the tape with said rear surface engaging the outer side of said flange and said hook engaging over said flange to maintain said retaining means in position.

8. Tape retaining means as defined in claim 7, in which said sheet is of generally triangular configuration.

9. Tape retaining means as defined in claim 7, in which said cylindrical enlargement comprises a tubular yieldable member received on said elastic band.

10. Tape retaining means for tape wound on a reel having a hub and spaced flanges, said retaining means comprising a flat sheet of relatively rigid material providing a rear surface for engaging the side of a reel and an exposed front surface, a straight edge on said sheet of a length not greater than the diameter of a reel to which said retaining means is to be applied, the remaining periphery of said sheet being formed to lie within the periphery of the reel flanges when applied to a reel, apertures in said sheet adjacent the ends of said straight edge, an elastic band extending through said apertures, a tape engaging enlargement on the portion of said band adjacent said rear surface and a metallic hook secured to said sheet opposite said straight edge, said hook projecting inwardly of said rear surface, whereby said enlargement may be disposed inwardly of a flange of a reel in engagement with the tape with said rear surface engaging the outer side of said flange and said hook engaging over said flange to maintain said retaining means in position.

11. Tape retaining means for tape wound on a reel having a hub and spaced flanges, said retaining means comprising a flat sheet providing a rear surface for engaging the side of a reel and an exposed front surface, a straight edge on said sheet of a length not greater than the diameter of a reel to which said retaining means is to be applied, the remaining periphery of said sheet being formed to lie within the periphery of the reel flanges when applied to a reel, apertures in said sheet adjacent the ends of said straight edge, an elastic band extending through said apertures, a tape engaging yieldable enlargement on the portion of said band adjacent said rear surface and a metallic hook secured to said sheet opposite said straight edge, said hook projecting inwardly of said rear surface, whereby said enlargement may be disposed inwardly of a flange of a reel in engagement with the tape with said rear surface engaging the outer side of said flange and said hook engaging over said flange to maintain said retaining means in position.

12. Tape retaining means for tape wound on a reel having a hub and spaced flanges, said retaining means comprising a flat sheet providing a rear surface for engaging the side of a reel and an exposed front surface, a straight edge on said sheet of a length not greater than the diameter of the reel to which said retaining means is to be applied, the remaining periphery of said sheet being formed to lie within the periphery of the reel flanges when applied to a reel, apertures in said sheet adjacent the ends of said straight edge, an elastic band extending through said apertures and a hook secured to said sheet opposite said straight edge, said hook projecting inwardly of said rear surface, whereby a portion of said band may be disposed inwardly of a flange of a reel in engagement with the tape with said rear surface engaging the outer side of said flange and said hook engaging over said flange to maintain said retaining means in position.

No references cited.